United States Patent Office 3,325,239
Patented June 13, 1967

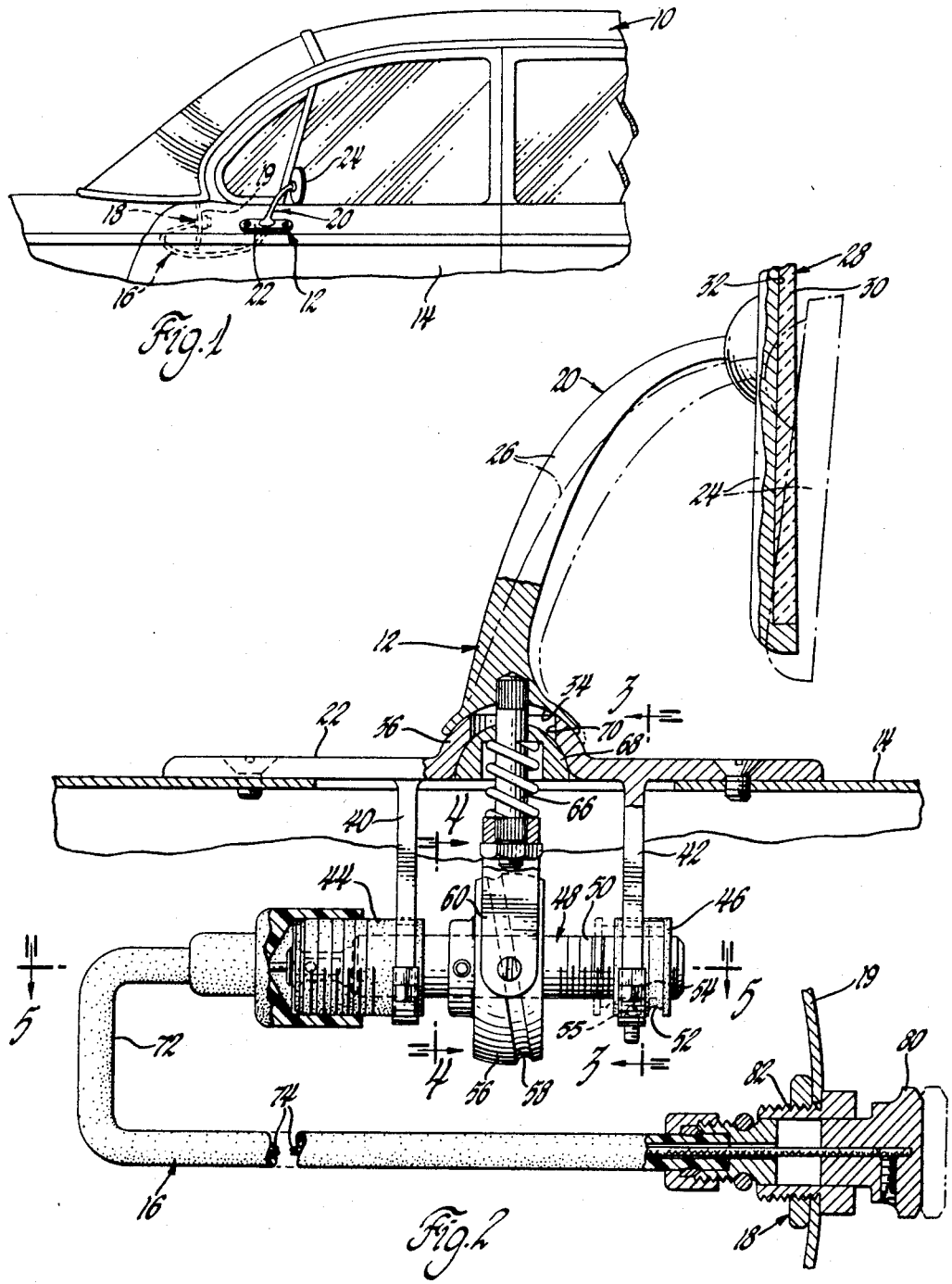

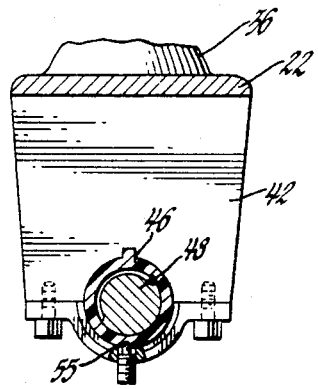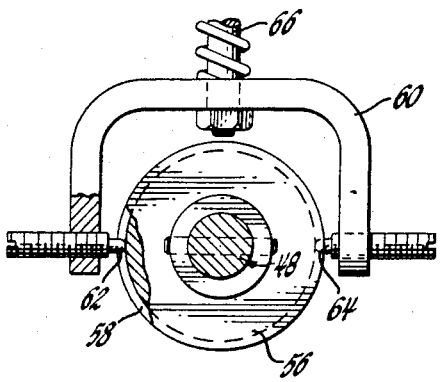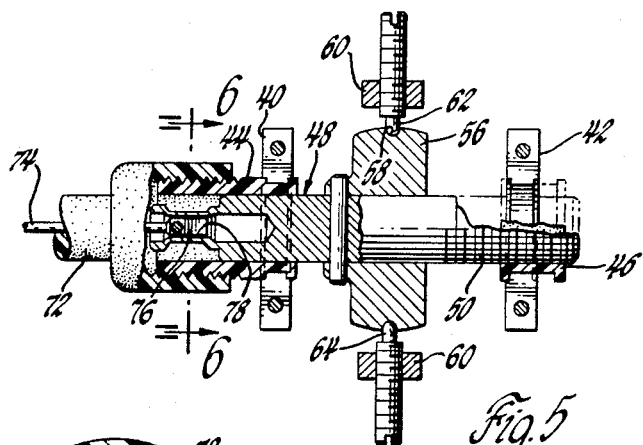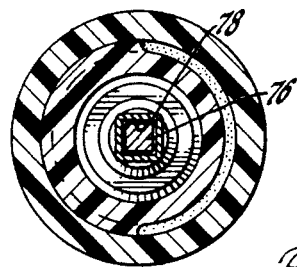

3,325,239
OPERATING MECHANISM FOR REMOTELY
CONTROLLED REAR-VIEW MIRROR
Edmond R. Gionet, Warren, and Robert C. Liem, Rochester, Mich., assignors to General Motors Coroporation, Detroit, Mich., a corporation of Delaware
Filed Nov. 15, 1963, Ser. No. 323,983
6 Claims. (Cl. 350—281)

This invention pertains to vehicle rear-view mirrors and more particularly to outside rear-view mirrors of the type with remote control means for adjusting the angle of the mirror from within the vehicle.

One object of the present invention is to provide an improved mirror assembly of the above-described type that is simple in construction, durable in operation, and inexpensive to manufacture. Another object of this invention is to provide a remotely controlled mirror assembly which has the entire operating mechanism concealed within the door or fender of the vehicle so as to eliminate the need for a separate mirror support housing. A further object of this invention is to provide a remotely controlled rear-view mirror which can be moved from a "day" to a "night" position so as to eliminate headlight glare during night-time driving. A still further object of this invention is to provide a remotely controlled outside mirror that can be founted on a vehicle door and has an operating mechanism which prevents the mirror support from being moved out of adjustment as a result of forces occasioned by the normal door slam.

Stated broadly, the above objects and others are accomplished with a mirror assembly comprising a substantially flat vehicle mounting bracket one side of which universally pivotally carries the mirror support while the other side supports the operating mechanism. The operating mechanism is characterized by having a cam that is connected through a flexible cable to a remotely located knob, the rotation of which causes simultaneous rotative and axial movement of the cam. Means are provided for transmitting the cam movement to the mirror support so that the latter can be adjustably positioned about mutually perpendicular pivot axes. As an added feature, the cam can be supported for movement between a "day" and "night" position so that in response to push or pull actuation of the knob the mirror support can be tilted to a position which eliminates headlight glare during night-time driving.

A more complete understanding of this invention will be obtained from the following detailed description with reference to the drawings, in which:

FIGURE 1 is a fragmentary side elevational view of a vehicle in which the door thereof is provided with a remotely controlled outside mirror assembly made in accordance with the invention, FIGURE 2 is an enlarged detail view partly in section of the mirror assembly of FIGURE 1, FIGURE 3 is a view taken on lines 3—3 of FIGURE 2, FIGURE 4 is a view taken on lines 4—4 of FIGURE 2, FIGURE 5 is a view taken on lines 5—5 of FIGURE 2, and FIGURE 6 is an enlarged sectional view taken on lines 6—6 of FIGURE 5.

Referring now to FIGURE 1, a fragmentary portion of a vehicle 10 is shown having a rear-view mirror assembly 12 mounted on the outer surface of a door 14 and connected through a flexible cable 16 to an actuator 18 secured to the instrument panel 19 within comfortable reach of the driver.

As best seen in FIG. 2, the mirror assembly 12 comprises a mirror portion 20 mounted on a substantially flat support bracket 22 and including a mirror support 24 that has a downwardly extending arcuate stem 26 fixed to the rear thereof. The mirror support 24 carries a prismoidal mirror element 28 which has two reflecting surfaces 30 and 32 that respectively reflect an image of low and high intensity to the driver. Mirror elements of this type are well known in the art and one example of such an element can be seen in U.S. Patent 3,075,430 granted to Woodward et al. on Jan. 29, 1963.

The lower end of the stem 26 is formed with a spherical seating portion or socket 34 that rests upon a similarly formed spherical or ball portion 36 raised from the exposed surface of the support bracket. A pair of ears 40 and 42 extend downwardly from the inner surface of the support bracket and respectively carry axially aligned bushings 44 and 46 which in turn support the opposite ends of a shaft 48. The shaft end located in bushing 44 is free to rotate and move axially relative thereto; however, the bushing 46 is provided with internal threads which accommodate a threaded portion 50 of the shaft 48 so that upon rotation of the latter, the shaft can be threaded into or out of the bushing and accordingly moved along its axis relative to the support bracket. In addition, it should be noted that the bushing 46 is supported by the ear 42 for axial movement between two positions, one of which is illustrated by the full lines and the other by the dotted lines, as seen in FIGURE 2. In order to maintain the bushing 46 in each of the positions, the latter is provided with two recessed spherical seats 52 and 54 formed at axially spaced points. As seen in FIGURES 2 and 3 detent means in the form of a spring-loaded ball 55 is carried by the ear 42 and serves to cooperate with the seats 52 and 54 for releasably holding the bushing 46 in either of the aforementioned positions. The purpose for this arrangement will become more apparent as the description of the invention proceeds.

A cylindrical camming member 56 is rigidly and concentrically secured to the shaft 48 adjacent the threaded portion thereof and has the periphery formed with an annular groove or track 58 that lies in an inclined plane extending transversely of the shaft axis. As seen in FIGS. 4 and 5, a clevis or yoke member 60 has the arms thereof provided with followers or prong members 62 and 64 that seat within the track 58 at diametrically opposite points thereof. The yoke member 60 is rigidly connected with the socket portion of the stem 26 through a pin 66 that extends through a spring-biased bearing member 68 and an aperture 70 formed in the ball portion 36.

At this point, it should be noted that inasmuch as the bushing 44 permits the shaft 48 to rotate and slide therein and a threaded engagement exists between the shaft and the bushing 46, rotational movement of the shaft results in simultaneous rotation and axial movement of the camming member. As should be apparent, such movement is transmitted through the yoke member 60 and pin 66 to the mirror portion 20 to cause the latter to simultaneously oscillate about the longitudinal axis of the pin 66 and about a transverse axis that passes through the imaginary center point of the ball portion 36 perpendicular to the axis of the pin. Thus, as seen in FIGURES 1 and 2, the mirror support 24, in effect, scans a predetermined area by moving either to the left or to the right about the transverse axis while at the same time moving sideways from one extreme position to another as determined by the degree of inclination of the track 58.

In order to realize the above-described movement of the mirror support 24, the flexible cable 16, which is capable of transmitting both rotary and reciprocating movement, has one end of the sheath portion 72 rigidly connected with the bushing 44 while the other end is fixed to the actuator 18. As seen in FIGURES 5 and 6, the wire portion 74 of the cable is formed at one end with an elongated key 76 that is square in cross-section and extends into a similarly formed bore 78 provided in one end of the shaft. The key is fixed to the shaft 48 while the opposite end of the wire portion is secured to a knob 80 that is slideably and rotatably carried within a housing 82. Thus, with this arrangement, when the driver rotates the knob 80 in a clockwise direction the shaft 48 is threaded into the bushing 46 so that simultaneous rotation and axial movement of the camming member occurs causing the mirror support 24 to oscillate about the pin axis and simultaneously tilt to the left about the transverse axis, as described above. Counterclockwise rotation of the knob results in the shaft 48 moving out of the bushing 46 and to the left, as seen in FIG. 2, and thereby causing the mirror support to similarly oscillate about the pin axis; however, in this instance pivot to the right about the transverse axis.

It will be noted that in the above-described mirror assembly, the mirror suport 24 can be selectively moved between two predetermined positions about the transverse horizontal axis so as to present one or the other of the reflecting surfaces of the prismoidal mirror element. Thus, during daytime driving surface 32 of higher reflecting intensity will be used by the vehicle driver; however, at nighttime the surface 30 will be moved into position to present an image reflection of reduced intensity so as to decrease headlight glare from a vehicle in the rear. As seen in FIGURE 2, assuming the full line position of the mirror support 24 gives the driver a "daytime" reflection, in order to move the mirror support to the "night" position, the driver simply pulls the knob 80 to the right. The pulling force acts on the shaft 48 and serves to overcome the detent means holding the bushing 46 so that the latter and the shaft move to the left until the ball 55 is seated in the seat 52. As a result of such movement, the mirror support 24 is tilted to the dotted line position which would constitute the "night" position.

From the above description, it should be apparent that this mirror assembly provides a great amount of flexibility in the designing of the mirror portion 20. This is so because the operating mechanism is disposed within the door of the vehicle, and only the mirror portion extends above the support bracket. Moreover, it should be noted that this mirror assembly is constructed so that forces occasioned by normal door slam will not affect the position of the mirror support 24. In other words, the splined connections between the mirror support and yoke member and the fact that the latter is restrained from twisting about the axis of the pin 66 by the followers 62, 64 set in groove 58 serves to prevent a force couple acting about the pin axis from changing the position of the mirror support.

Various changes and modifications of the above-described mirror assembly can be made without departing from the spirit of the invention. Such changes and modifications are contemplated and therefore it should be understood that the inventor does not wish to be limited except by the scope of the following claims.

We claim:

1. A rear-view mirror assembly for a vehicle comprising a mirror support, a mirror element mounted in said mirror support, a stem having one end fixed to the rear of said mirror support, a generally flat support bracket mountable on said vehicle, the support bracket having means universally pivotally supporting the other end of said stem, a shaft having a screw portion, means on the bracket opposite the mirror support for rotatably supporting the shaft with the longitudinal axis of the latter substantially normal to the reflecting surface of said mirror element, a portion of said means having threads accommodating said screw portion so that rotation of the shaft in either direction causes the latter to move axially relative to said support bracket, a cylindrical member concentrically fixed to said shaft, a guide track formed around the cylindrical member and lying in a plane transverse to and inclined to said longitudinal axis, a yoke member having a pair of followers supported by the guide track at diameetrically opposite points thereof, a pin having one end rigidly secured to said yoke member, the other end of said pin fixed to said other end of said stem, remotely located operating means including a housing, a knob rotatably supported by said housing, a flexible cable connecting said shaft with said knob so that rotation of the latter causes the shaft to simultaneously rotate and move axially whereby such movement is transmitted through the yoke member and pin to the mirror support so that the latter simultaneously oscillates about the longitudinal axis of the pin and about an axis perpendicular thereto passing through the universal pivot means on the support bracket for adjusting the mirror support.

2. A rear-view mirror assembly for a vehicle comprising a mirror support, a stem having one end fixed to the rear of said mirror support and the other end formed as a socket, a support bracket mountable on said vehicle and having a raised spherical portion formed on one side thereof, said spherical portion having an aperture therein and supporting the socket portion of said stem, a pair of spaced ears extending from the other side of the support bracket, a shaft having a screw portion, a bushing connected to each of said ears for rotatably supporting the shaft, one of said bushings having internal threads accommodating said screw portion so that rotation of the shaft in either direction causes the latter to move axially relative to said support bracket, a cylindrical member concentrically fixed to said shaft, a guide track formed around the cylindrical member and lying in a plane transverse to and inclined to said longitudinal axis, a yoke member having a pair of followers supported by the guide track at diametrically opposite points thereof, a pin having one end rigidly secured to said yoke member, the other end of said pin extending through said aperture and fixed to said stem, remotely located operating means including a housing, a knob rotatably supported by said housing, a flexible cable connecting said shaft with said knob so that rotation of the latter causes the shaft to simultaneously rotate and move axially whereby such movement is transmitted through the yoke member and pin to the mirror support so that the latter simultaneously oscillates about the longitudinal axis of the pin and about an axis perpendicular thereto passing through the imaginary center of the raised spherical portion for adjusting the mirror support.

3. A rear-view mirror assembly for a vehicle comprising a mirror support, a mirror element in the mirror suppot, a stem having one end fixed to the rear of said mirror support and the other end formed as a socket, a support bracket mountable on said vehicle and having a raised spherical portion formed on one side thereof, said spherical portion having an aperture therein and supporting the socket portion of said stem, a pair of spaced ears extending from the other side of the support bracket, a shaft having a screw portion, a bushing connected to each of said ears for rotatably supporting the shaft with the longitudinal axis thereof substantially normal to the reflecting surface of said mirror element, one of said bushings having internal threads accommodating said screw portion so that rotation of the shaft in either direction causes the latter to move axially relative to said support bracket, a cylindrical member concentrically fixed to said shaft, a guide track formed around the cylindrical member and lying in a plane transverse to and inclined to said longitudinal axis, a yoke member having a pair of followers supported by the guide track at diametrically opposite points thereof, a pin having one end rigidly secured to said yoke member, the other end of said pin extending through said aperture and fixed to said stem, remotely located operating means including a housing, a knob rotatably supported by said housing, a flexible cable connecting said shaft with said knob so that rotation of the latter causes the shaft to simultaneously rotate and move axially whereby such movement is transmitted through the yoke member and pin to the mirror support so that the latter simultaneously oscillates about the longitudinal axis of the pin and about an axis perpendicular thereto passing through the imaginary center of the raised spherical portion for adjusting the mirror support.

4. A rear-view mirror assembly comprising a mirror support, a mirror element mounted in said mirror support, a stem having one end fixed to the rear of said mirror support and the other end formed as a socket, a generally flat support bracket having a raised spherical portion formed on one side thereof, said spherical portion having an aperture and supporting the socket portion of said stem, a pair of spaced ears extending from the other side of the support bracket and located on opposite sides of said aperture, a shaft having a screw portion, a bushing connected to each of said ears for rotatably supporting the shaft with the longitudinal axis thereof substantially normal to the reflecting surface of said mirror element, one of said bushings having internal threads accommodating said screw portion so that rotation of the shaft causes the latter to move axially relative to said support bracket, a cylindrical member concentrically fixed to said shaft, a grooved guide track formed around the cylindrical member and lying in a plane transverse to and inclined to said longitudinal axis, a yoke member having a pair of followers supported by the guide track at diametrically opposite points thereof, a pin having one end rigidly secured to said yoke member, the other end of said pin extending through said aperture and fixed to said stem, remotely located operating means including a housing, a knob rotatably supported by said housing, a flexible cable connecting said shaft with said knob so that rotation of the latter causes the mirror support to simultaneously oscillate about the longitudinal axis of the pin and about an axis perpendicular thereto for adjusting the mirror support.

5. A rear-view mirror assembly comprising a mirror support, a mirror element having two reflecting surfaces of different reflecting power mounted in said mirror support, a stem having one end fixed to the rear of said mirror support and the other end formed as a socket, a generally flat support bracket having a raised spherical portion formed on one side thereof, said spherical portion having an aperture and supporting the socket portion of said stem, a pair of spaced ears extending from the other side of the support bracket and located on opposite sides of said aperture, a shaft having a screw portion, a bushing connected to each of said ears for rotatably supporting the shaft with the longitudinal axis thereof substantially normal to the reflecting surfaces of said mirror element, one of said bushings having internal threads accommodating said screw portion so that rotation of the shaft causes the latter to move axially relative to said support bracket, said one of said bushings supported by the associated ear for shifting movement between a first and second position, yieldable detent means carried by said associated ear for holding the bushing in each of said positions, a cylindrical member concentrically fixed to said shaft, an annular guide track formed around the cylindrical member and lying in a plane transverse to and inclined to said longitudinal axis, a yoke member having a pair of prong-like followers supported by the guide track at diametrically opposite points thereof, a pin having one end rigidly secured to said yoke member, the other end of said pin extending through said aperture and fixed to said stem, remotely located operating means including a housing, a knob rotatably and slidably supported by said housing, a flexible cable connecting said shaft with said knob so that rotation of the latter causes the mirror support to simultaneously oscillate about the longitudinal axis of the pin and about an axis perpendicular to the longitudinal axis of said shaft, and shifting movement of said knob causes said shaft to move from one of said positions to the other to move the mirror support about said axis perpendicular to the longitudinal axis of said shaft and thereby present one of said two reflecting surfaces to the viewer.

6. A rear-view mirror assembly for a vehicle, comprising a mirror support, a support bracket, a mounting portion fomed with said support bracket for attaching the later to said vehicle, means formed on said mounting portion for universally pivotally supporting said mirror support, an aperture formed in said means, a shaft having a screw portion, means extending from said mounting portion and formed on the side opposite the mirror support for rotatively supporting the shaft along an axis substantially parallel to said mounting portion, a portion of said latter-mentioned means having internal threads accommodating said screw portion so that rotation of the shaft in either direction causes the latter to move axially relative to said support bracket, a cylindrical member concentrally fixed to said shaft, a guide track formed around the cylindrical member, a yoke member having a pair of followers supported by the guide track at diametrically opposite points thereof, a pin having one end rigidly secured to said yoke member, the other end of said pin extending through said aperture and fixed to said mirror support, remotely located operating means including a housing, a knob rotatably supported by said housing, a flexible cable connecting said shaft with said knob so that rotation of the latter causes the shaft to simultaneously rotate and move axially whereby such movement is transmitted through the yoke member and pin to the mirror support so that the latter simultaneously oscillates about the longitudinal axis of the pin and about an axis perpendicular thereto passing through the universal pivot means on the support bracket for adjusting the mirror support.

References Cited
UNITED STATES PATENTS 3,170,332    2/1965    Peters _____ 88—93 X
3,253,509    5/1966    Peters _____ 88—77

JEWELL H. PEDERSEN, *Primary Examiner.*

JOHN K. CORBIN, DAVID H. RUBIN, *Examiners.*